United States Patent [19]

Hayashi et al.

[11] Patent Number: 4,511,103
[45] Date of Patent: Apr. 16, 1985

[54] TAPE END DETECTING DEVICE IN A TAPE PLAYER

[75] Inventors: Hideki Hayashi; Yukio Ito; Yukio Akiike; Shigeo Kinoshita, all of Tokyo, Japan

[73] Assignee: Clarion Co., Ltd., Tokyo, Japan

[21] Appl. No.: 533,373

[22] Filed: Sep. 16, 1983

[30] Foreign Application Priority Data

Sep. 24, 1982 [JP] Japan ................. 57-164991

[51] Int. Cl.³ .............. B65H 59/38; G03B 1/04; G11B 15/32
[52] U.S. Cl. .................... 242/186; 360/74.2
[58] Field of Search .................. 242/186–189, 242/191; 360/69, 71, 73, 74.1, 74.2, 74.3, 137

[56] References Cited

U.S. PATENT DOCUMENTS

| | | | |
|---|---|---|---|
| 3,563,493 | 2/1971 | Bielke et al. | 242/186 |
| 4,089,487 | 5/1978 | Ichikawa et al. | 242/186 |
| 4,202,513 | 5/1980 | Osanai | 242/189 |
| 4,210,944 | 7/1980 | Fushimi et al. | 360/74.2 |
| 4,269,373 | 5/1981 | Tsuchiya et al. | 242/191 |

Primary Examiner—Leonard D. Christian
Attorney, Agent, or Firm—Flynn, Thiel, Boutell & Tanis

[57] ABSTRACT

The tape end detecting device comprises a check plate disposed for frictional, rotatable engagement with a boss of one of reel bases in a tape player, a guide hole formed in the check plate and including a set region and a reset region defined by a projection extending into the guide hole, a check pin formed on a detection plate and slidably engaging the guide hole, a cam follower linked to the detection plate, first cam formed on a rotation plate for concurrent rotation with a motor power to move the cam follower along its cam surface so as to reciprocate the check pin from the set region to the reset region of the guide hole, and second cam portion formed on the rotation plate radially outward of the first cam to move the cam follower along its cam surface while the check pin engages the projection of the guide hole. The first cam includes a set cam surface to reciprocate the check pin within the set region of the guide hole and a reset cam surface to reciprocate the check pin in the reset region beyond the projection of the guide hole. The set cam surface occupies a larger revolution angle than that of the reset cam surface of the cam so that it takes a longer time for the cam follower to pass the set cam surface than it passes the reset cam surface.

6 Claims, 8 Drawing Figures

TAPE END DETECTING DEVICE IN A TAPE PLAYER

FIELD OF THE INVENTION

This invention relates to a tape end detecting device in a tape player, and more particularly to such a device using friction of a reel base to mechanically detect a tape end.

BACKGROUND OF THE INVENTION

The direction of tape travel in an automatically reversible tape player has to be reversed when a tape has completed its travel in one direction during its reproduction, recording (both collectively called "play"), fast forwarding and rewinding modes. The reverse action is automatically effected in response to an order from a detecting means which detects the tape end. Such a tape end detecting means is one of the most important elements of a tape player and there are many proposals as to detecting methods. The proposals are divided broadly into two categories: one is electrical detection by means of detection of reel base rotation which is converted into pulses by a switch, photocoupler or the like; and the other is mechanical detection by means of detection of changes of tape tensile force.

The mechanical detection means include a mechanism capable of detecting a tape end by friction between a reel base and a check plate.

More specifically, the mechanism comprises, as shown in FIG. 1, a reel base 1 having a boss 2 integrally formed therewith, a check plate 3 disposed in friction contact with the circumferential surface of the boss 2, and a guide hole 5 formed in the check plate 3 and including a relatively narrower set region 5a and a wider reset region 5b defined by a projection 4 which is the point for tape end detection. The reset region 5b is divided into two parts symmetric with respect to the projection 4 so that the tape end detection may be effected whichever direction the reel base rotates. Thus, the set region 5a and the two parts of the reset region 5b of the guide hole 5 make a configuration like the letter Y as a whole.

A detection plate 6 is pivotally supported by an axle 8, and has an end 6a provided with a check pin 7 for reciprocal movement in the guide hole 5 and another end 6b connected to a mechanism for reversing the tape travel direction and which is actuated when a tape end is detected.

The reciprocal movement of the check pin 7 in the guide hole 5 is effected by a cam 9 linked to the detection plate 6 and rotated by a motor not shown. More specifically, the cam 9 is formed on a rotation plate 10 which is continuously driven by a motor. The cam encircles the rotation axle of the rotation plate 10 and includes a set cam surface and a reset cam surface which gradually extend away from or approach the axle of the rotation plate 10 as shown in FIG. 3. The end 6b of the detection plate 6 is provided with a pin-shaped cam follower 11 contacting the cam surfaces of the cam 9 so that as the cam follower 11 is moved by the cam surfaces toward and away from the axle of the rotation plate 10, the check pin 7 moves in the Y-shaped guide hole 5 from the set region 5a to the reset region 5b, as shown in FIG. 1.

The rotatable plate 10 is also provided with an isolated cam 12 radially outwardly isolated from the cam 9 so that as the cam follower 11 is moved by the isolated cam 12, the check pin 7 moves from one end of the set region 5a remote from the reset region 5b upto the tip of the projection 4 in the guide hole 5, as shown in FIG. 2.

The detection plate 6 is connected to the base plate of the tape player by a spring 13 so that the cam follower 11 is biased toward the cam 9 and the isolated cam 12.

The device performs the tape end detection in the following manner:

(1) FIG. 1 . . . During Tape Travel

As the cam follower 11 moves from the largest radius point A on the set cam surface toward the smaller radius cam surface of the cam 9 along with the rotation of the cam 9, the check pin 7 in the guide hole 5 moves from an intermediate position of the set region 5a toward the projection 4. If the reel base 1 is rotating and the tape is travelling when the check pin 7 gets out of the set region 5a, the check plate 3 shifts due to the friction between itself and the reel base 1. Thus, the check pin 7 contacts one side edge of the wider reset region 5b and moves far into the reset region without engaging the projection 4. So, tape end detection is not carried out. Concurrently, the cam follower 11 passes a detection point B (FIG. 3) of the cam 9 and starts moving along the reset cam surface. When the cam follower 11 reaches the smallest radius point C (FIG. 3) on the reset cam surface, the check pin 7 reaches the deepest position in the reset region 5b of the guide hole 5 and thereafter returns as the cam follower 11 moves toward the larger radius cam surface of the reset cam surface. When the check pin 7 again reaches the tip of the projection 4 and as the cam follower 11 starts moving along the set cam surface beyond a point D which is equally spaced from the rotation axle as to the detection point B, the check pin 7 enters in the set region 5a of the guide hole 5. Due to this, the check plate 3 is returned to its original detectable angle against the friction that exists between it and the reel base 1. As the cam follower 11 further moves toward the largest radius point A, the check pin 7 moves to an intermediate position of the set region 5a, and after the cam follower 11 reaches the largest radius point A, the check pin 7 again moves toward the projection 4.

Thus, while the tape runs, the cam follower 11 movable from the set cam surface to the reset cam surface of the cam 9 merely permits the detection plate 6 to repeat reciprocal movement corresponding to the movement of the check pin 7 between the intermediate position of the set region 5a and the deepest position of the reset region 5b of the guide hole 5. This means that while the detection plate 6 repeats said reciprocal movement, the tape is not exhausted yet. A mechanism (not shown) for reversing the tape travel direction is not actuated during this time.

(2) FIG. 2 . . . Tape End Detection

When the reel base 1 stops the rotation because of the end of a tape, the check plate 3, which was biased in one direction because of the frictional engagement with the reel base, is released from the biasing force. Then, the check pin 7, which reached the projection 4 from the set region 5a of the guide hole 5 concurrently with the arrival of the cam follower 11 at the detection point B from the largest radius point A on the set cam surface, engages the tip of the projection 4 and cannot enter far into the reset region 5b.

The rotatable plate 10 continues to rotate after the check pin 7 engages the projection 4. The detection plate 6 does not pivot clockwise. The cam follower 11 cannot further follow the reset surface of the rotating cam 9 and instead it is located at a position spaced from the rotation axle of the cam 9 a distance equal to the spacing of detection point B from the rotation axle of the cam 9 so as to be outwardly spaced from the smaller radius cam surface. As the rotatable plate 10 further rotates, the cam follower 11 contacts the outer periphery of the isolated cam 12 and is pushed by the isolated cam 12 so that the detection plate 6 rotates in the opposite direction counterclockwise. Since the cam surface of the isolated cam 12 bulges more largely than the largest radius point A of the cam 9, the check pin 7 reciprocates between the tip of the projection 4 and the deepest position of the set region 5a of the guide hole 5. Therefore, the detection plate 6 rotates counterclockwise through a larger angle than it rotates during the tape travel and actuates the tape direction reversing mechanism linked thereto.

It should be noted, however, that the overall cam surface of the cam 9 defines a curved line bulging out in the form of an eccentric circle or an oval as shown in FIG. 3 so that the check pin 7 moved by the cam 9 travels at a substantially constant speed in the guide hole 5. Therefore, the detection point B, which is spaced from the rotation axle the same distance as the entrance of the isolated cam 12, is positioned on the larger radius cam surface with respect to the rotation axle of the cam 9. As the result, the set cam surface for moving the check pin 7 in the set region 5a of the guide hole 5 has a rotation angle smaller than that of the reset cam surface for moving the check pin 7 in the reset region 5b of the guide hole 5.

Since the distance between the largest radius point A and the detection point B is proportional to the rotation angle of the set cam surface, if the rotation angle is small as in the prior art described above, the check pin 7 moves in the first region 5a in a too short time to detect even a momentary repose of the reel base.

To bring a tape pack to a play position in an auto-loading tape player by a motor power, it is necessary to drive the motor when the tape pack is halfway inserted into the tape player. When the tape pack is thereafter fully inserted by the motor, a head and pinch rollers are brought into pressure contact with the tape and start conveying the tape. Therefore, it takes time, that is, the time that is required for displacement of the head and the pinch rollers, between the insertion of the tape cassette and the start of the tape transport.

If the reel base is driven concurrently with the motor energization, the tape will be driven by the reel base throughout the time required for the displacement of the head and the pinch rollers before the play mode is completed, thereby causing a phenomenon called "head-cut" wherein the starting part of the tape is not reproduced. The phenomenon spoils the reproduction particularly when the tape is set in the tape pack so that the beginning of one of music pieces recorded on the tape is positioned just at the play starting position as a result of the music selecting operation.

The most usual measure to prevent the phenomenon is to keep the reel base operatively disconnected from the motor by an idler gear interposed therebetween before the head and the pinch rollers forcibly contact the tape. In this case, the reel base stands still for a short time.

If the prior art tape end detecting device employing the cam as shown in FIG. 3 is applied to the above-described auto-loading tape player, there occurs a problem that the detecting device detects the momentary standstill of the reel base, before the forcible contact of thread, as if the stopping of the reel base was caused by tape exhaustion.

In particular, before the forcible contact of the head, since the check pin 7 remains in the set region 5a of the guide hole 5 as it was upon the preceding tape end detection, and the cam follower 11 contacts the set cam surface of the cam 9, the cam follower 11 reaches the detection point B so early that the detection plate 6 falsely detects a tape end immediately after the rotation plate 10 starts rotating due to energization of the source power because the rotation angle of the first cam portion of the cam 9 is too small.

As the result, whereas the tape is not yet exhausted, the tape travelling direction is reversed so as to change one program to another, or alternatively in another type player, a stop mechanism is actuated to bring back the head and the pinch rollers away from the pressure contact positions and sometimes causes tape pack ejection.

OBJECT OF THE INVENTION

It is therefore an object of the invention to provide a tape end detecting device in a tape player, which device never erroneously detects as a tape end, a momentary stopping of a reel base before forcible contact of a head with a tape.

SUMMARY OF THE INVENTION

In accordance with the invention, there is provided a tape end detecting device in a tape player which comprises:
 a pair of reel bases;
 a check plate operatively linked to one of said reel bases;
 a guide hole formed in said check plate and divided into a reset region and a set region by a projection extending into said guide hole;
 a check pin slidably engaging said guide hole;
 a detection plate formed at one end thereof with said check pin;
 a rotation plate;
 first cam formed on said rotation plate;
 second cam formed on said rotation plate radially outwardly from said first cam;
 a cam follower operatively linked to the other end of said detection plate and moved by said first cam to reciprocate said check pin from said set region to said reset region of said guide hole or alternatively moved by said second cam when said check pin engages said projection in said guide hole;
 said first cam including a set cam surface to reciprocate said check pin in said set region of said guide hole, a reset cam surface to reciprocate said check pin in said reset region beyond said projection of said guide hole, said set cam surface having a larger revolution angle than that of said reset cam surface, so that while said check pin moves in said set region of said guide hole for a relatively long time, a head and pinch rollers complete their displacement to the tape path and said reel bases are thereafter rotated to bias said check plate due to friction, thereby deferring tape end detection by said check plate.

DETAILED DESCRIPTION OF THE PREFERRED EMBODIMENT

Figure 1:
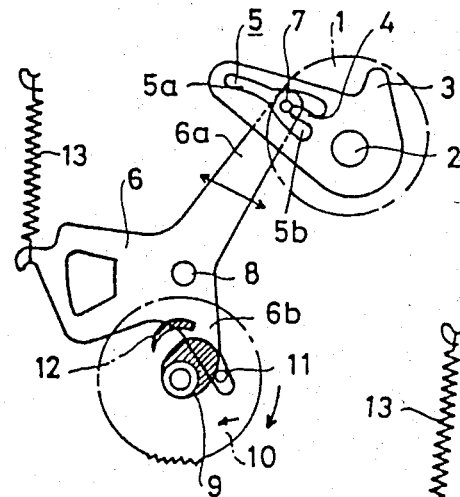
FIG. 1 is a plan view of a conventional tape end detecting device in a tape travelling mode.
Figure 2:
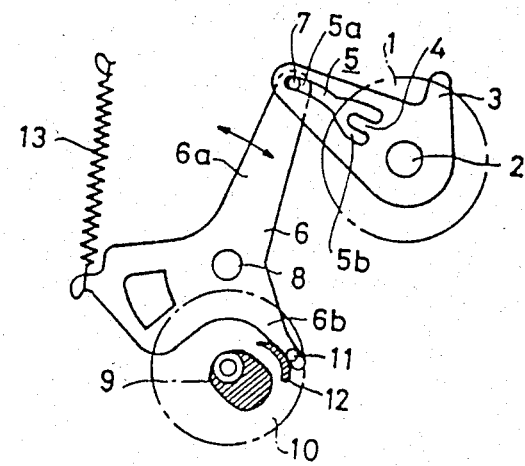
FIG. 2 is a plan view of the device of FIG. 1 in a state where a tape is exhausted.
Figure 3:
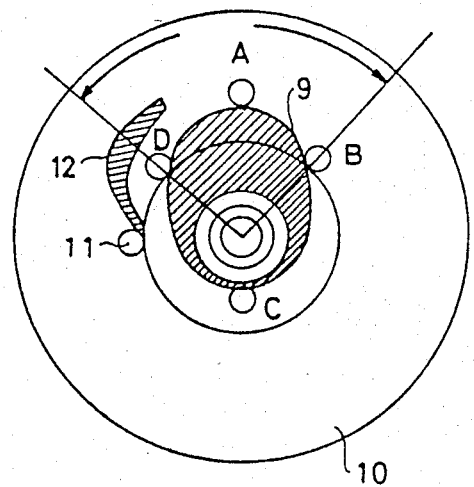
FIG. 3 is a plan view of cams employed in the device of FIGS. 1 and 2.

The invention will now be described in detail by reference to a preferred embodiment illustrated in the drawings. The general concept of the embodiment is to provide each of two reel bases in an auto-return tape player with a check plate so that tape end detection is always performed by one of the check plates associated with the reel base in the tape takeup mode.

Construction (1) Check Plate and Detection Plate

First reel base 20F is operative in the tape takeup mode when a tape travels forward and a second reel base 20R is operative in the takeup mode when the tape travels reversely. The reel bases 20F and 20R are formed with bosses 21F and 21R pivotally, frictionally supporting check plates 22F and 22R. Each check plate is formed at one end portion thereof with a guide hole 23 in the form of the letter Y, for example, consisting of a narrow set region and a wider reset region. The reset region is divided into two right and left parts by a projection 24 extending toward the set region. Each check plate is further provided at the other end thereof with a pin 25.

A detection plate 26 is disposed parallel to a line connecting the centers of the reel bases 20F and 20R. The detection plate 26 is formed with guide holes 27 at both end portions thereof. Guide pins 28 secured to the base plate of the tape player are inserted in the guide holes 27 to guide lengthwise movement of the detection plate 26. A spring 29 is connected between the detection plate 26 and the base plate to bias the detection plate 26 toward the second reel base 20R. The detection plate 26 is further provided with check pins 30F and 30R formed at both end portions that extend toward the check plates 22F and 22R, respectively. The check pins 30F and 30R are inserted in the guide holes 23, respectively.

(2) Trace Plate

A relay plate 31 is disposed to pivot about the axle of the second reel base 20R. The relay plate 31 has one end engaging the detection plate 26 and the other end engaging one end of a trace plate 32. The trace plate 32 is configured in the form of the letter L and has one end engaging the relay plate 31 and the other end pivotally supported on the axle 33. The trace plate 32 is provided close to the inside corner thereof with a pin-shaped cam follower 34. A geared rotation plate 35 driven by a motor is provided at the central portion thereof with a cam 36 and is located so that the cam follower 34 contacts the circumferential cam surface of the cam 36. The cam follower 34 is biased toward the cam 36 by the energy of the spring 29 transmitted thereto via the detection plate 26 and the relay plate 31.

(3) Cams

Figure 8:
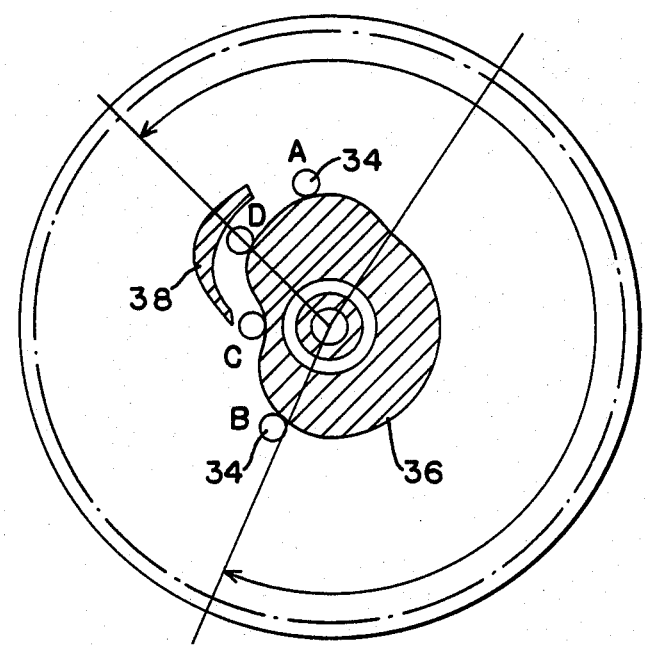
FIG. 8 is an enlarged plan view of cams which are employed in the same device.

As shown in FIG. 8, the cam 36 includes a set cam surface 36a located relatively remote from the axle 37 of the rotation plate 35 and a concave reset cam surface 36B closer to the axle 37. The set cam surface 36a includes a resettable cam surface 36c that is continuous with the preceding leading end of the reset cam surface 36b in the direction of rotation of the plate 35. The resettable surface 36c has a constant radius so long that when the cam follower 34 contacts the resettable surface 36c, each of the check pins 30F and 30R be positioned just before the projection 24 of the guide hole 23. The rotation angle of the resettable cam surface 36c is substantially half the overall revolution angle of the cam 36. Therefore, the set cam surface 36a including the resettable surface 36c make a revolution angle larger than that of the reset cam surface 36b so that the revolution angle from the largest radius point A on the set cam surface 36a to the tape end detection point B is larger than that of the conventional device.

The rotation plate 35 is further provided with a crescent-shaped isolated cam 38 so disposed that the leading end thereof in the direction of rotation of the plate 35 is located radially outward the reset cam surface 36b of the cam 36 and is equally distant from the axle 37 of the cam 36 and from the detection point B of the cam surface. The central part of the isolated cam 38 is more distant from the axle 37 than the largest radius point A so that when the cam follower 34 moves along this part, the trace plate 32 rotates counterclockwise into a position radially outward from the axle 37 of the rotation plate 35 to the maximum extent.

(4) Intermittent Gear

The trace plate 32 is formed on the outer corner thereof with a projection 39. A stopper 41 is pivotally mounted about an axle 42 and has one end connected to the base plate of the tape player by a spring 43 so that the other end of the stopper 41 is biased to enter a recess 44 formed along the outer periphery of an intermittent gear 40. The stopper 41 has a step 45 engageable with the projection 39 of the trace plate 32. The intermittent gear 40 is operatively linked to a power plate (not shown) which actuates a tape travel direction reversing mechanism.

(5) Means for Biasing the Check Plate

The check plates 22F and 22R are selectively biased leftward in the Figures by a wire spring 46 pushing the pin 25. The wire spring 46 is pivotally supported at a ring-shaped center thereof by an axle 47 and bulges at both sides of the center thereof in its biasing direction.

(6) Idler Plate

An idler plate 48 extends parallel with a line connecting the axles of the reel bases 20F and 20R. The idler plate 48 is formed at both ends thereof with arcuate guide holes 49 each receiving a guide pin 50 secured to the base plate of the tape player so that the idler plate 48 is movable in the form of an arc bulging toward the detection plate 26. The idler plate 48 is formed at a central portion thereof with a projecting changeover member 51 contactable with the wire spring 46 to pull it away from the detection plate 26. More specifically, when the idler plate 48 is placed at a neutral position, the changeover member 51 faces the center of the wire spring 46 which is relatively depressed and does not apply any force to the wire spring 46. On the other hand, when the idler plate 48 moves toward the first reel base 20F, for example, so that the changeover member 51 contacts the first bulging portion (nearer to the first reel base 20F) of the wire spring 46, the changeover member 51 pulls the said portion of the wire spring 46 to rotate it so that the opposite end of the wire spring 46 pushes the pin 25 of the second check plate 22R. See FIG. 4.

An idler gear 52 is rotatably supported at a central position of the idler plate 48. The idler gear 52 engages first drive gear 53F for driving the first reel base 20F and a tooth train 54F formed along the periphery of the first reel base 20F so as to drive the first reel base 20F in tape takeup mode when the idler plate 48 is biased to the first reel base, and engages second drive gear 53R formed along the periphery of the rotation plate 35 for driving the second reel base 20R and a gear train 54R formed along the periphery of the second reel base 20R so as to drive the second reel base 20R in tape takeup mode when the idler plate 48 is biased to the second reel base 20R.

Function

Function of the tape end detecting device will be described hereunder.

Figure 4:
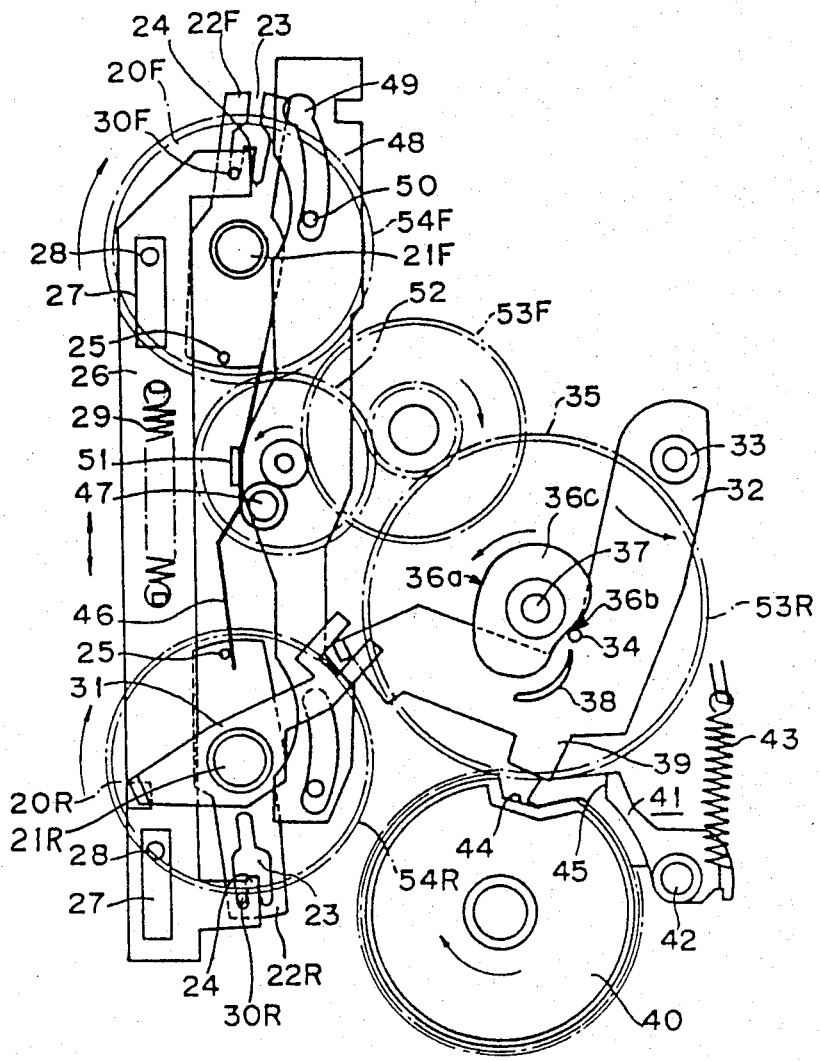
FIG. 4 is a bottom view of a tape end detecting device embodying the invention in a state where a tape is travelling in the forward direction.

(1) Forward Travel of a Tape . . . FIG. 4

While a tape travels forward, the idler plate 48 is biased toward the first reel base 20F to engage the idler gear 52 with the first drive gear 53F and the tooth train 54 of the first reel base 20F, thus rotating the first reel base 20F in the clockwise direction to take up the tape.

In this case, the changeover member 51 of the idler plate 48 pulls the first bulging portion of the wire spring 46 to disengage the associated end thereof from the pin 25 of the first check plate 22F and permit the first check plate 22F to rotate freely. As the result, the first check plate 22F is rotatable up to the tape end detectable angular position when the first reel base 20F stops rotating.

On the other hand, since the second bulging portion (nearer to the second reel base 20R) of the wire spring 46 is not pulled by the changeover member 51 of the idler plate 48, the associated end of the wire spring 46 still engages the pin 25 of the second check plate 22R so as to bias the second check plate 22R in the counterclockwise direction to the extent that it did before the second reel base 20R stops rotating. Therefore, the second check plate 22R does not change its angular position and cannot detect the tape end.

Thus, at the end of the forward travel of the tape, the tape end detection is performed merely by the first check plate 22R in the forward mode takeup group.

Figure 5:
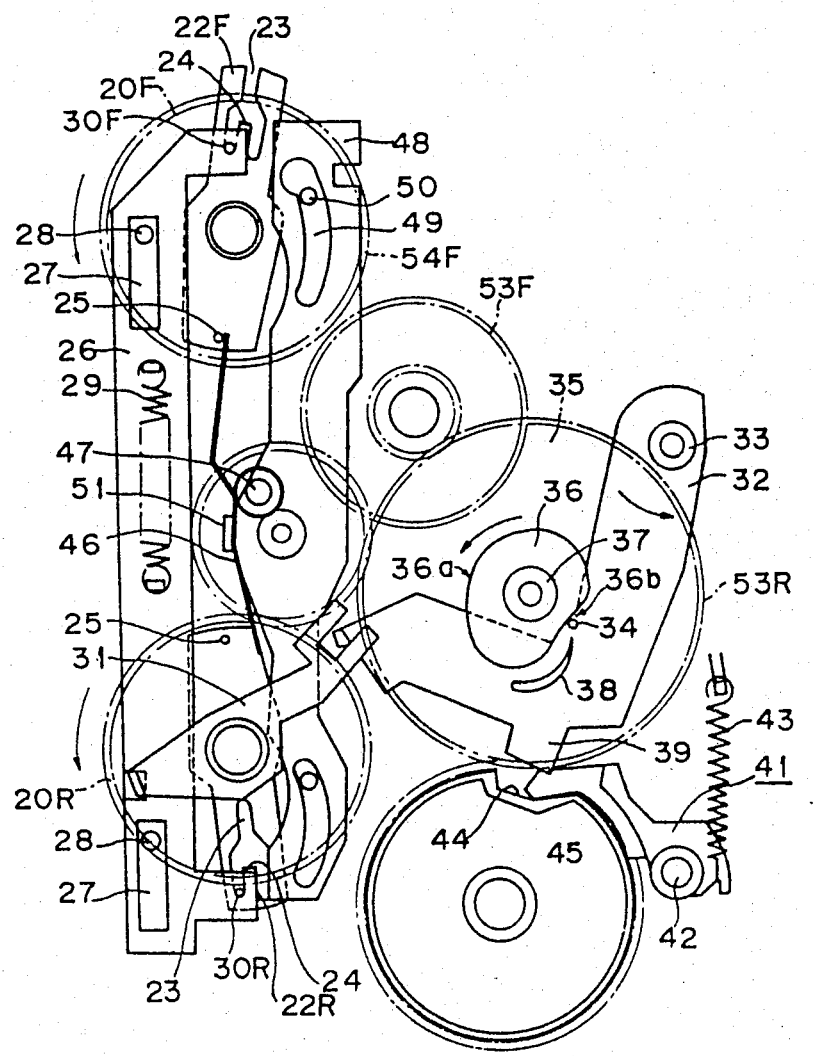
FIG. 5 is a bottom view of the same device in a state where the tape is travelling in the reverse direction.

(2) Reverse travel of a Tape . . . FIG. 5

While a tape travels reversely, the idler plate 48 is shifted toward the second reel base 20R. Then, the idler gear 52 on the idler plate 48 engages with the second drive gear 53R of the rotation plate 35 and the tooth train 54R of the second reel base 20R to drive the second reel base 20R in takeup mode. The first reel base 20F is out of engagement with the idler gear 52 and is changed into the supply mode.

Since the idler plate 48 is shifted toward the second reel base 20R, the changeover member 51 pulls the second bulging portion of the wire plate 46 to disengage the associated end of the wire plate 46 from the pin 25 of the second check plate 22R. As the result, when the second reel base 20F stops rotating, the second check plate 22R rotates up to an angular position for enabling the tape end detection.

On the other hand, the first end of the wire spring 46 pushes the pin 25 of the first check plate 22F so that although the first reel base 20F stops rotating, the first check plate 22F keeps the angular position that it had at the time of rotation of the first reel base 20F. Therefore, the first check plate cannot detect the tape end.

Thus, at the end of the reverse mode travel of the tape, the tape end detection is performed merely by the second check plate 22R in the reverse mode takeup group.

(3) Tape Travel Mode Detection

The next explanation is how to detect whether a tape is exhausted or not during forward travel mode, for example.

In the forward mode of the tape player, the second check plate 22R is always biased by the wire plate 46 as shown in FIG. 4 so as not to detect a tape end, and therefore, only the first check plate 22F, which is not biased by the wire plate 46, can detect the tape end.

More specifically, while the cam follower 34 of the trace plate 32 moves along the set cam surface 36a from the largest radius point A of the cam 36, the first check pin 30F of the detection plate 26 operatively linked to the trace plate 32 moves in the narrow set region of the guide hole 23 of the check plate 22F. Therefore, the first check plate 22F is disposed parallel with the detection plate 26 so that the projection 24 in the guide hole 23 be positioned on the route through which the check pin 30F moves.

If a tape travels and the reel bases 20F and 20R rotate in the above-assumed state, as soon as the first check pin 30F gets out of the narrow set region of the guide hole 23, the first check plate 22F rotates due to the friction with the first reel base 20F up to the angular position where the check pin 30F contacts one side edge of the wide region of the guide hole 23 and keeps this angular position. Therefore, the check pin 30F never contacts and never is blocked by the projection 24 so as to allow the detection plate 26 to reciprocate to the full length of the guide hole 23 along with the pivoting of the trace plate 32 which is caused by continuous contact of the cam follower 34 with the overall circumference of the cam 36. While the cam follower 34 keeps contacting the cam 36, the trace plate 32 does not rotate so far from the axle 37 of the cam 36 that the projection 39 of the trace plate 32 can push the stopper 41 apart from the intermittent gear 40. Therefore, the intermittent gear 40 is kept unrotatable by the stopper 41 engaging the recess 44 and does not actuate a tape travel direction changeover mechanism operatively linked thereto.

Figure 6:
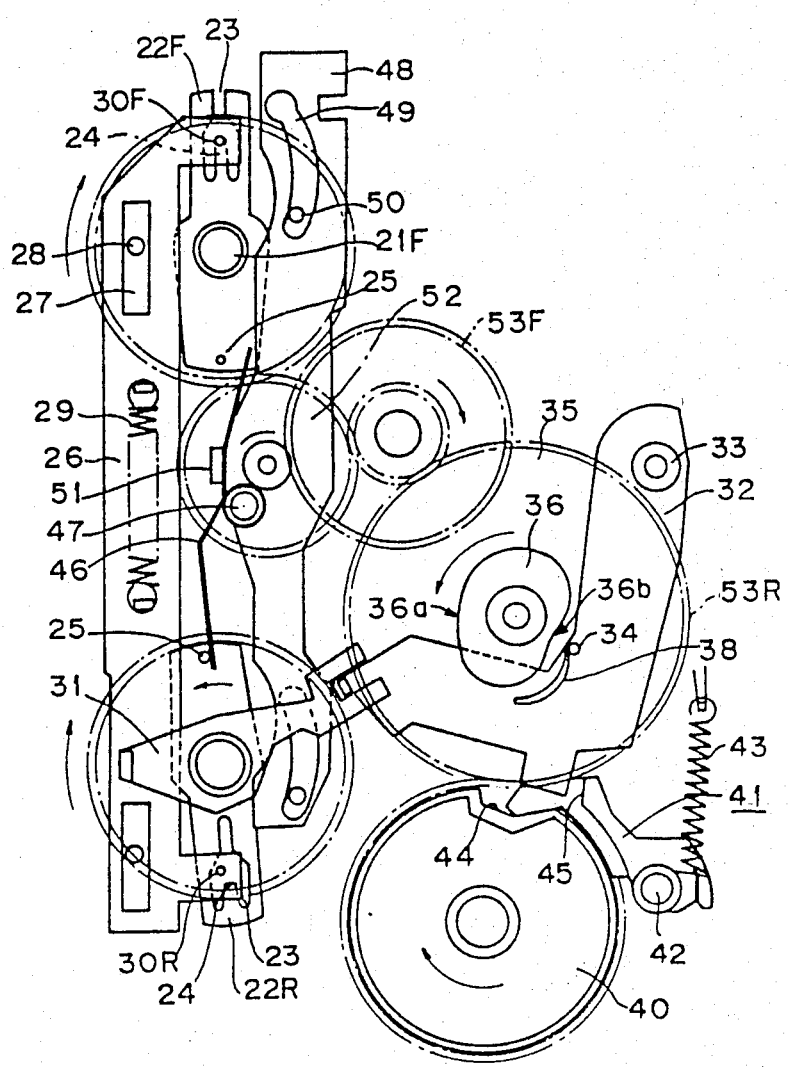
FIG. 6 is a bottom view of the same device starting the tape end detection at the end of the forward travelling tape.
Figure 7:
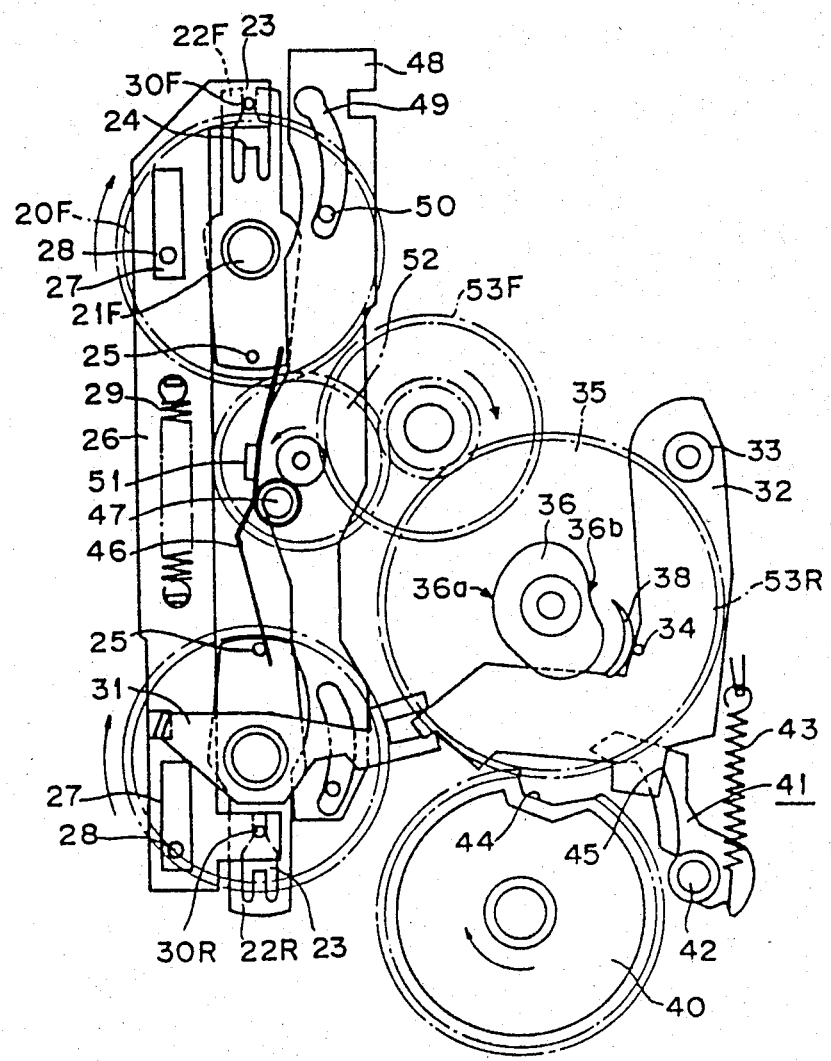
FIG. 7 is a bottom view of the same device in the course of the tape end detection.

(4) Tape End Detection . . . FIGS. 6 and 7

When the first reel base 20F stops because of exhaustion of the tape, no friction is generated to rotate the check plate 22F. Therefore, when the check pin 30F gets out of the narrow region into the wide region of the guide hole 23, the check plate 22F remains parallel to the detection plate 26 so that the projection 24 thereafter engages the check pin 30F to block further movement of the check pin 30F and the detection plate 26. Due to this, the trace plate 32 connected to the detection plate 26 via the relay plate 31 is also prevented from further rotating toward the axle 37 of the cam 36 whereas the rotation plate 35 and the cam 36 continue rotating. Therefore, as shown in FIG. 6, after the detection point B of the cam 36 passes the cam follower 34, the cam follower 34 cannot further keep contacting the succeeding reset cam surface of the cam 36. As the cam 36 further rotates, the isolated cam 38 contacts the cam follower 34 to push it and the trace plate 32 away from the axle 37 of the cam 36. In this case, since the outer periphery of the isolated cam 38 bulges farther from the axle 37 than the largest radius portion A of the cam 36, the trace plate 32 is rotated farther from the axle 37 than it is rotated by the cam 36 so that the detection plate 26 moves in the opposite direction to move the check pin 30F away from the projection 24 toward the narrow set region of the guide hole 23.

At the same time, the projection 39 of the trace plate 32 pushes the step 45 of the stopper 41 so as to rotate the stopper 41 in the counterclock direction about the axle 42 and disengages it from the recess 44 of the intermittent gear 40. Therefore, the intermittent gear 40 rotates to actuate the tape travel direction changeover mechanism to reverse the tape travelling direction.

It should be noted that during the reverse travel mode of the tape, the first check plate 22F is kept inoperative by the wire spring 46, and the tape end detection is performed in the substantially same manner by the second check plate 22R freed by the wire plate 46.

(5) Function of the Resettable Surface of the Cam

The cam 36 in the embodiment includes the resettable surface 36c which occupies half the overall revolution angle of the cam 36, approximately, so that the revolution angle of the set cam surface 36a and the resettable surface 36c is much larger than that of the reset cam surface 36b. The cam follower 34 which follows the cam 36 from the largest radius point A keeps a constant position from the axle 37 of the cam 36 while it follows the resettable surface 36c. Since the constant position is radially outward relative to the detection point B, the check pin 30F operatively linked to the cam follower 34 stops before and a little away from the projection 24 during this time. Therefore, while the check pin 30F thus stands still, even if the check plate 22F is disposed parallel with the detection plate 26 due to the stop of rotation of the reel base 20F, tape end detection is not performed. Detection whether the tape is exhausted or not, is possible only after the cam follower 34 passes the resettable surface 36c of the cam 36 depending upon whether the check plate 22F is disposed parallel with the detection plate 26 or is rotated due to rotation of the reel base 20F.

Since it takes a long time for the cam follower 34 to move from the largest radius point A to the detection point B and there is a possibility of deferring the tape end detection throughout the time, any stoppage of the reel base during this time is never detected as a tape end, and the device detects a tape end only after the cam follower 34 passes the resettable surface 36c and if the check plate 22F is then disposed parallel with the detection plate 26.

Effects of the Embodiment

As described above, the invention provides a longer time than the prior art for deferring tape end detection even when the reel base stops rotating because a large revolution angle from the largest cam point A to the detection point B of the cam 36 is reserved. As the result, it overcomes the drawbacks noted above, namely that the tape travelling direction is reversed even upon a short time stopping of the reel base from the time of insertion of the tape to the time of pressure contact of a head, and that the starting part of the tape is taken up without being reproduced before the head is brought into the play position.

Since the embodiment provides each reel base with a check plate, the following unique effects are obtained.

Each reel base in an auto-returnable tape player alternatively operates to take up or supply a tape. If the check plate is attached to only one of the reel bases, half the tape end detections must be done by one of the reel bases operative in the tape supply mode. However, this leads to the following drawbacks causing various troubles of the tape player or cassette packs.

(1) When the takeup mode reel base interrupts its rotation because of some trouble or too stiff rolling of a tape during play mode, the pinch rollers and capstans continue rotating as they forcibly sandwich the tape. Therefore, the tape is drawn off the supply mode reel base to make a tape portion of great looseness which clings to the pinch rollers and capstans, thereby causing troubles of the tape player and damage of the tape.

(2) When the tape player is changed from the fastforwarding mode to the play mode, the takeup mode reel base immediately stops because the tape is forcibly sandwiched by the pinch rollers and the capstans. However, the supply mode reel base continues rotating a little longer due to inertia caused by its preceding high speed rotation and produces looseness of the tape. Thereafter, even after the takeup mode reel base operates in the play mode to take up the tape, the supply mode reel base does not rotate before the tape looseness is eliminated. The tape end detecting device erroneously judges that the stopping of the supply mode reel base indicates the end and reverses the tape travel direction.

The embodiment, however, completely overcomes the above-mentioned troubles because the wire spring keeps the check plate on the supply mode reel base inoperative so that only the check plate on the takeup mode reel base can detect a tape end.

OTHER EMBODIMENTS

The invention is not restricted to the above-described embodiment, and the following modifications may be adopted, too.

(1) The detection plate 26 may be linked to the trace plate 32 directly (not via the relay plate 31) or via plural relay plates 31.

(2) A link interlocking the idler plate 48 for the opposite movement thereof may be employed instead of the wire spring 46 so as to push the second check plate on the second reel base (reverse mode takeup reel base) when the idler plate 48 is biased to the first reel base (forward mode takeup reel base) and push the first check plate on the first reel base when the idler plate 48 is biased to the second reel base, to keep the respective check plate inoperative.

(3) The idler plate 48 may be provided at both end portions thereof with tapered cams to alternatively push the check plates 22F and 22R so as to keep one of them on a supply mode reel base inoperative.

(4) It is possible to provide only one of the reel bases with the check plate to detect both the forward mode and reverse mode tape ends upon stopping of the associated reel base.

(5) The two-step guide hole of the check plate 22F or 22R may be formed in a staircase instead of the letter Y so as to detect a tape end merely of the forward or reversely transported tape.

(6) The resettable surface of the cam 36 need not be constant in its radius and may be formed so that the radius decreases from the largest radius point A to the detection point B.

EFFECT OF THE INVENTION

As described above, the tape end detecting device according to the invention merely detects true tape ends and never misjudges a momentary stopping of the reel base to be a tape end even if the reel base stops after insertion of a tape cassette before pressure contact of a head, for example. Therefore, the device never erroneously causes reversal of the tape travel direction to change the program, interruption of the motor or ejection of a cassette.

This advantage gives a great assurance in designing the tape player so that the reel bases stand still before the head is brought into the play position so as not to transport the tape.

We claim:

1. A tape end detecting device in a tape player which comprises:
   a pair of reel bases;
   a check plate operatively linked to one of said reel bases;
   a guide hole formed in said check plate and divided into a reset region and a set region by a projection extending into said guide hole;
   a check pin slidably engaging said guide hole;
   a detection plate formed at one end thereof with said check pin;
   a rotation plate;
   first cam formed on said rotation plate;
   second cam formed on said rotation plate radially outwardly of said first cam;
   a cam follower operatively linked to the other end of said detection plate and moved by said first cam to reciprocate said check pin from said set region to said reset region of said guide hole or, alternatively, moved by said second cam when said check pin engages said projection in said guide hole;
   said first cam including a set cam surface to reciprocate said check pin in said set region of said guide hole, a reset cam surface to reciprocate said check pin in said reset region beyond said projection of said guide hole, said set cam surface having a larger revolution angle than that of said reset cam surface.

2. A device as set forth in claim 1 wherein said set cam surface includes a resettable cam surface having a constant radius from the rotational axis of said first cam to keep said check pin stop in front of and a little away from said projection in said guide hole.

3. A device as set forth in claim 2 wherein said resettable cam surface occupies about one half of the overall revolution angle of said first cam.

4. A device as set forth in claim 2 wherein said reset region of said guide hole is divided into two parts by said projection so that the overall guide hole has a configuration like the letter Y.

5. A device as set forth in claim 1 including a trace plate operatively linked to said detection plate, said cam follower being formed on said trace plate so that said cam follower is operatively linked to said detection plate.

6. A device as set forth in claim 1 further including another check plate operatively linked to the other reel base and formed with another guide hole, another check pin formed at the other end of said detection plate and inserted in said another guide hole, and a pressing means for selectively biasing one of said check plates that is linked to the reel base that is in the tape supply mode in the opposite direction relative to the rotation of said reel base that is in the tape supply mode.

* * * * *